United States Patent Office 3,298,955
Patented Jan. 17, 1967

3,298,955
LUBRICANTS CONTAINING NON-ASH-FORMING ADDITIVES
Aart Strang, Amsterdam, Netherlands, assignor to Shell Oil Company, New York, N.Y., a corporation of Delaware
No Drawing. Filed Oct. 5, 1964, Ser. No. 401,653
Claims priority, application Netherlands, Jan. 29, 1964, 6,400,690
20 Claims. (Cl. 252—51.5)

This invention relates to lubricating oil compositions and to novel non-ash-forming additives thereof.

It is known that lubricating oils containing certain metallic salts or soaps such as metal sulfonates possess good dispersing and detergent properties. Such lubricants, however, tend to form metallic deposits in engine parts which interfere with the effective operation of the engine. As a result, recent trends in this field have been to use non-ash-forming polymeric nitrogen-containing dispersants of high molecular weight such as copolymers of polymerizable amines or amides with long-chain acrylate esters which are described in U.S. Patent 2,737,496 and Belgian Patent 550,422, respectively. These non-ash-forming polymeric compounds are good detergents but under engine operating conditions tend to break down and form sludge and corrosion. Attempts to overcome these deficiencies by modification of these polymers or by use of auxiliary additives in combination with these polymers has met with little success. Thus, modifying polymers by introducing certain groups tends often to destroy or reduce the original desirable properties which the polymers possess. In cases where auxiliary additives appeared to be promising stabilizers and corrosion inhibitors, they were metal-containing compounds and compounds of this type are to be avoided because of their tendency to complex with the polymer and increase sludge formation as well as for reasons stated above.

It is an object of the present invention to provide an improved non-ash-forming lubricating oil composition. It is another object of the invention to provide an improved detergent lubricant possessing good stability and corrosion inhibitor properties. Still another object of the invention is to provide a sludge resistant non-ash-containing lubricating oil composition. Other objects will become apparent during the following description of the invention.

Now in accordance with the present invention, it has been found that lubricating oil compositions of excellent detergency and stability can be provided by incorporating into such lubricating oil compositions from about 0.1% to about 10% by weight of an oil-soluble polyamide of a lower aliphatic monocarboxylic acid having not more than 8 carbon atoms, preferably 4 carbon atoms and a polyalkylene polyamine having at least 3 or more amine units at least one of the amines not amidized with the lower aliphatic monocarboxylic acid containing an olefinic polymer chain (R) having from about 40 to about 700 carbon atoms, preferably from about 50 to about 300 carbon atoms and having a molecular weight range of from about 400 to about 10,000 and preferably from about 700 to about 5000 and which may be directly linked to a nitrogen atom or indirectly through an acyl radical RCO—where R is an olefinic polymer as defined and preferred is when the radical R is attached directly to an amine nitrogen of the amidized polyalkylene polyamine. These oil-soluble products can be represented by the probable formula

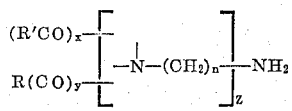

(I)

where R is an olefinic polymer as defined above, R' is a $C_{1-8}$ alkyl radical preferably a $C_{1-4}$ alkyl radical, $n$ is an integer of from 1 to 8, preferably 2 to 3, $x$ is an integer of 2 or more, preferably 3 to 5, $y$ is a number of from zero to 1 and $z$ is an integer of 3 or more preferably 4 to 8. Preferred products can be represented by the probable formula

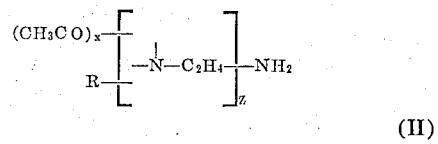

(II)

where R is an olefinic polymer of from 50 to 300 carbon atoms, $x$ is 3 to 5 and $z$ is 4 to 8. The oleophilic olefinic polymer represented by the symbol R not only functions as an oil-solubilizing unit but also imparts detergency, anti-corrosion action and stability to the final product.

Examples of suitable polyamines from which compounds according to the invention are derived include triethylene tetramine, tetraethylene pentamine, pentaethylene hexamine, tripropylene tetramine, tetrapropylene pentamine, polyethylene polypropylene polyamine, di(1-methylamylene)triamine, tributylene tetramine, and mixtures thereof.

Preference is given to compounds derived from polyethylenepolyamines. The polyethylenepolyamines are also taken to include the nitrogen-containing hetero-ring substituted amines which develop when heating a polyethylenepolyamine in the presence of hydrogen chloride.

Examples of polyethylenepolyamines are triethylenetetramine and tetraethylenepentamine and mixtures of these polyamines with lower and higher polyethylenepolyamines.

Detergency, anti-corrosion action and stability is imparted to the polyalkylene polyamines in part by attaching directly or indirectly to the nitrogen atoms olefinic polymer (R) units which may include olefinic polymers which may be straight or branched chain, and which may contain substituent groups and are derived from monomers or comonomers of various olefins such as polyethylene groups, polypropylene groups, polybutylene, polyisobutylene groups, polyisobutenyl groups, polyethylene/polypropylene groups, polyethylene/poly-alpha-methyl styrene groups and the corresponding groups without double bonds.

The oleophilic-detergent group (R) can be directly introduced into the polyamine by halogenating the polyolefins so as to form alkyl or alkenyl halides and alkylating the polyamines with these halides. Any hydrogen halide formed can be readily removed by any suitable means.

The oleophilic group R can be indirectly attached to nitrogen atoms of the polyamine through an acyl radical (RCO—) by forming long chain aliphatic monocarboxylic acids by treating an alpha or beta olefin with carbon monoxide and hydrogen under the influence of cobalt carbonyl (oxo-reaction) followed by oxidation of the resultant aldehyde/alcohol mixture, or by oxidation of an olefin with an oxidant, such as nitric acid or oxygen, if desired, in the presence of a catalyst. A reaction product which has been obtained by addition of formaldehyde on to an olefin (Prins' reaction) followed by oxidation of the resultant adduct, is another method for preparing suitable carboxylic acids which, as such or as acid chloride or anhydride, may be reacted with a polyamine. Suitable carboxylic acids can also be prepared by addition of halogen on to an olefin, followed by hydrolyzing oxidation of the dihalogen compound obtained.

With the preparation of aliphatic monocarboxylic acids from hydrocarbons often non-converted hydrocarbon is left in the acid obtained. These hydrocarbon/acid mixtures may, without further purification, be applied as a starting material for the preparation of the products according to the invention.

The oleophilic modified polyamines described can be treated with aliphatic monocarboxylic acids containing up to 8 carbon atoms such as acetic, propionic, butyric, isobutyric, valeric acids or their anhydrides or their acid chlorides or their mixtures under usual reaction conditions.

The polyamines can be also first polyamidized with the lower aliphatic monocarboxylic acids or their derivatives as described above and then the oleophilic-detergent group or groups introduced on free nitrogen atoms directly by alkylation to form at least one R—N< unit or indirectly by acylation to form at least one RCON< unit where R is defined in (I) and (II).

The invention is illustrated by the following examples:

EXAMPLE I

Preparation of monopolyisobutenyltetraacetyltetraethylenepentamine.

In this preparation technical N-polyisobutenyltetraethylenepentamine was taken as the starting material. This technical product consisted of 42% wt. pure N-polyisobutenyltetraethylenepentamine with a molecular weight of 1030 and 58% wt. polyisobutene with a molecular weight of 900. This mixture had a nitrogen content of 2.83% wt. The acetylation was carried out as follows:

To 800 parts by weight of the mixture of N-polyisobutenyltetraethylenepentamine and polyisobutene 300 parts by weight of acetic anhydride and 300 parts by weight of pyridine were added. The mixture obtained was boiled under reflux for 16 hours. After cooling down, the reaction mixture was diluted with 1000 parts by weight of pentane and washed with quantities of 100 parts by weight of a 1:1 (v./v.) mixture of water and isopropanol until the wash liquor gave a neutral reaction. Subsequently, the solvents were removed by distillation. The yield was 860 parts by weight, the nitrogen content was 2.57% wt., the content of basic nitrogen, determined by titration with perchloric acid, was 0.6% wt. This product was subjected to engine tests without further purification.

EXAMPLE II

*Preparation of monopolyisobutanoyltetraethylenepentamine*

In this preparation a technical N-polyisobutanoyltetraethylenepentamine obtained from technical polyisobutane carboxylic acid was taken as the starting material. The technical polyamine contained 32.6% wt. pure N-polyisobutanoyltetraethylenepentamine with a molecular weight of 1280 and a nitrogen content of 5.45% wt. and 67.4% wt. polyisobutene with a molecular weight of 1150. This technical amine was acetylated as follows:

To 1000 parts by weight of the technical N-polyisobutanoyltetraethylenepentamine a mixture of 200 parts by weight of acetic anhydride and 200 parts by weight of pyridine were added. After boiling under reflux for 20 hours the mixture was cooled down to room temperature. After diluting with a double quantity by volume of pentane the resulting mixture was washed with quantities of 100 parts by weight of a 1:1 (v./v.) mixture of isopropanol and water until the wash liquor gave a neutral reaction. After removal of the solvents by distillation the yield amounted to 1052 parts by weight. The nitrogen content was 1.69% wt. Basic nitrogen could not be demonstrated by titration with perchloric acid.

Other examples of additives of the present invention prepared essentially by the methods of Example I or II are: (III) N-monopolyisobutenylpentaacetyl pentaethylene hexamine, (IV) N-monopolyisobutenyltetraacetyltetrapropylenepentamine, (V) N-mono(polyethylene/propylene)tetraacetyltetraethylene pentamine, (VI) N-mono(polyethylene/alpha - methylstyrene)tetraacetyltetraethylenepentamine, (VII) N-monopolyisobutenyltetrapropionyltetraethylenepentamine, (VIII) N-monopolyisobutenyltributyryltriethylenetetramine, (IX) N-monopolypropylenetetracetyltetraethylenepentamine, (X) monopolybutylenetetravaleryltetraethylenepentamine. The polyolefins in Examples II–X have a molecular weight between 1200 and 10,000. If desired the reactions as exemplified by Examples I and II or the other illustrative examples can be carried out in the presence of a small amount of mineral oil and the oil allowed to remain after the reaction has been completed so as to form an oil concentrate containing the additive of the invention, which concentrate can be used as a lubricant per se or diluted with a suitable lubricating oil to form a finished product.

Another example (XI) of a suitable compound with oleophilic groups but derived from dicarboxylic acids is the alkenyl succinimides whose imide nitrogen atom is linked to an alkylamine or polyamine group of which one or more nitrogen atoms carry alkanoyl groups. Preferably a reaction product is prepared from acetic anhydride and the imide mixture formed from 1 mole of $C_{50-300}$ polyisobutenyl succinic anhydride and 1 mole of tetraethylenepentamine.

The products of this invention are completely soluble in mineral lubricating oils or in synthetic lubricants such as esters of dicarboxylic acids, e.g., di-2-ethylhexyl sebacate or diisoamyl adipate. If desired, the products of this invention may be incorporated in a low boiling solvent such as hexane, filtered to remove any insoluble contaminations, and subsequently stripped, if necessary, with steam to remove the solvent.

The additives according to the invention are excellent dispersants and impart very satisfactory properties to the lubricants in which they are contained. The lubricant base may be a mineral lubricating oil of various viscosities, such as SAE 5W to 90 or a synthetic lubricating oil such as esters of dicarboxylic acids e.g. di-2-ethylhexylsebacate or diisoamyl adipate or a lubricating oil containing fatty oil such as castor oil and the like. The concentration of the additive in the oil may vary within wide limits. In general, the desired detergent action is already brought about if the quantity added is between 0.1% and 10% wt., preferably between 1% and 3% by weight, but in special cases quantities larger than those mentioned may be added, for instance, if the lubricating oil is applied in diesel engines that are apt to become badly fouled.

The outstanding properties which additives of the present invention impart to lubricating oils is evidenced from the test data presented below.

Engine tests

For the engine tests a Gardner diesel engine and a Petter gasoline engine were used as described below. The concentration of the additive in the finished lubricant was 1.5% wt. The base oil used was a solvent-refined paraffinic lubricating-oil distillate. The viscosity of the base oil was 7.2 cs. in the test in the gasoline engine and 11.5 cs. in the test in the diesel engine.

Gardner diesel engine

Water-cooled single-cylinder four-stroke engine, bore 108 mm., stroke 152.4 mm., piston displacement 1.4 liters, power output 11 H.P. at 1200 revolutions per minute (60 mg. of fuel per power stroke). The test duration was 17 hours. The fuel was a gas oil with a sulfur content of 0.9% wt. The cooling-water temperature was 80° C.

In this engine the piston fouling was rated.

Petter gasoline engine

Water-cooled single-cylinder four-stroke engine, bore 85 mm., stroke 82.5 mm., piston displacement 468 cm.$^3$, compression ratio 10.0:1.

The test was carried out under varying conditions, namely, alternately 55 minutes at 1500 r.p.m. at 3.5 H.P. load and a mixture strength of 1.0 and 5 minutes at 1200 r.p.m. at 2 H.P. load and a mixture strength of 1.9. The test duration was 48 hours. The fuel was a premium motor gasoline with 0.4 ml. TEL[1] per liter (F–1 octane number ca. 100) and a sulfur content of 0.1% wt. The temperature of the cylinder cooling water was 80° C., that of the cooling water of the cooled timing gear cover 25° C.

In this test the degree of sludge formation on the timing gear cover was rated.

The results of the engine tests are recorded in Table I below.

TABLE I

| Additive used | Gardner diesel piston cleanliness, 10=clean | Petter gasoline engine degree of sludge formation, 10=clean |
|---|---|---|
| Additive of Example I | 9.3 | |
| Additive of Example II | 8.5 | 9.0 |
| None | 5.0 | 5.6 |

Substitution of Examples III–XI in concentration of about 2% for additive of Example I in oil composition tested above gives about the same results as the tested composition containing Example I additive in the above engine tests.

Lubricants containing the additives of the present invention may be combined with other additives, such as anti-oxidants, detergents additives, viscosity-index improvers, anti-corrosives, anti-foaming agents, agents to improve the lubricating effect, and other substances that are generally added to lubricants.

I claim as my invention:

1. A lubricating oil composition comprising a major amount of lubricating oil and a minor amount, sufficient to impart detergency, of an oil-soluble polyamide containing at least one polyolefinic group and having the formula

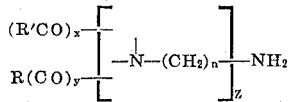

where R is a polyolefinic group having a molecular weight of from about 400 to about 10,000, R' is a $C_{1-8}$ alkyl radical, $n$ is an integer of from 1 to 8, $x$ is an integer of from 2–5, $y$ is a number of from zero to 1, and $z$ is an integer of from 3–8.

2. The composition of claim 1 where $n$ is an integer of from 2 to 3, $x$ is an integer of from 3 to 5, $y$ is zero and $z$ is an integer of from 4 to 8.

3. The composition of claim 1 where $n$ is an integer of from 2 to 3, $x$ is an integer of from 3 to 5, $y$ is 1 and $z$ is an integer of from 4 to 8.

4. A mineral lubricating oil composition comprising a major amount of a mineral lubricating oil and from about 0.1% to about 10% of an oil-soluble polyamide of an N-polyolefin-substituted polyalkylene polyamine and a lower aliphatic monocarboxylic acid of up to 8 carbon atoms, the polyolefin group having a molecular weight of from about 700 to about 5,000.

5. A mineral lubricating oil composition comprising a major amount of a mineral lubricating oil and from about 0.1% to about 10% of an oil-soluble polyamide of an N-polyisobutenyl-substituted polyethylene polyamine and an aliphatic monocarboxylic acid having up to 4 carbon atoms, the polyisobutenyl group having a molecular weight of from about 700 to about 5,000.

6. A mineral lubricating oil composition comprising a major amount of a mineral lubricating oil and from about 0.1% to about 10% of an oil-soluble polyamide of an N-polyisobutyl-substituted polyethylene polyamine and an aliphatic monocarboxylic acid having up to 4 carbon atoms, the polyisobutyl group having a molecular weight of from about 700 to about 5,000.

7. A mineral lubricating oil composition comprising a major amount of a mineral lubricating oil and from about 0.1% to about 10% of an oil-soluble polyamide of an N-polyisobutanoyl-substituted polyethylene polyamine and an aliphatic monocarboxylic acid having up to 4 carbon atoms, the polyisobutanoyl group having a molecular weight of from about 700 to about 5,000.

8. A mineral lubricating oil composition comprising a major amount of mineral lubricating oil and from about 0.1% to about 10% of an oil-soluble polyamide of an N-polyisobutenyl-substituted tetraethylenepentamide and acetic anhydride, the polyisobutenyl group having a molecular weight of from about 700 to about 5,000.

9. A mineral lubricating oil composition comprising a major amount of mineral lubricating oil and from about 0.1% to about 10% of an oil-soluble monopolyisobutenyl tetraacetyltetraethylenepentamine.

10. A mineral lubricating oil composition comprising a major amount of oil-soluble polyamide of monopolyisobutanoyltetraethylene pentamine and acetic anhydride, the polyisobutanoyl radical having a molecular weight of from 700 to about 5,000.

11. As a new compound an oil-soluble polyamide containing at least one polyolefinic group and having the formula

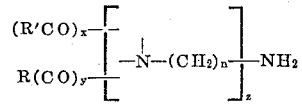

where R is a polyolefinic group having a molecular weight of from about 400 to about 10,000, R' is a $C_{1-8}$ alkyl radical, $n$ is an integer of from 1 to 8, $x$ is an integer of from 2–5, $y$ is a number of from zero to 1, and $z$ is an integer of from 3–8.

12. As a new compound the composition of claim 11 where $n$ is an integer of from 2 to 3, $x$ is an integer of from 3 to 5, $y$ is zero and $z$ is an integer of from 4 to 8.

13. As a new compound the composition of claim 11 where $n$ is an integer of from 2 to 3, $x$ is an integer of from 3 to 5, $y$ is 1 and $z$ is an integer of from 4 to 8.

14. As a new compound an oil-soluble polyamide of an N-polyolefin-substituted polyalkylene polyamine and a lower aliphatic monocarboxylic acid of up to 8 carbon atoms, the polyolefin group having a molecular weight of from about 700 to about 5,000.

15. As a new compound an oil-soluble polyamide of an N-polyisobutenyl-substituted polyethylene polyamine and an aliphatic monocarboxylic acid having up to 4 carbon atoms, the polyisobutenyl group having a molecular weight of from about 700 to about 5,000.

16. As a new compound an oil-soluble polyamide of an N-polyisobutyl-substituted polyethylene polyamine and an aliphatic monocarboxylic acid having up to 4 carbon atoms, the polyisobutyl group having a molecular weight of from about 700 to about 5,000.

17. As a new compound an oil-soluble polyamide of an N-polyisobutanoyl-substituted polyethylene polyamine and an aliphatic monocarboxylic acid having up to 4 carbon atoms, the polyisobutanoyl group having a molecular weight of from about 700 to about 5,000.

---

[1] By TEL is meant the commercially available "Ethyl Fluid," which contains 61.48% wt. tetraethyl lead, 18.81% wt. dichloroethane and 17.86% wt. dibromomethane (balance: coloring matter and kerosene).

18. As a new compound an oil-soluble polyamide of an N-polyisobutenyl-substituted tetraethylenepentamide and acetic anhydride, the polyisobutenyl group having a molecular weight of from about 700 to about 5,000.

19. As a new compound an oil-soluble monopolyisobutenyl tetraacetyltetraethylenepentamine.

20. As a new compound an oil-soluble polyamide of monopolyisobutanoyltetraethylene pentamine and acetic anhydride, the polyisobutanoyl radical having a molecular weight of from about 700 to about 5,000.

References Cited by the Examiner

UNITED STATES PATENTS

| 3,216,936 | 11/1965 | Le Suer | 252—51.5 X |
| 3,219,666 | 11/1965 | Norman et al. | 252—51.5 X |

FOREIGN PATENTS 983,040  2/1965  Great Britain.

DANIEL E. WYMAN, *Primary Examiner.*

P. P. GARVIN, *Assistant Examiner.*